United States Patent
Wernersson et al.

(10) Patent No.: US 9,935,695 B2
(45) Date of Patent: Apr. 3, 2018

(54) PRECODING A TRANSMISSION FROM A TWO-DIMENSIONAL ANTENNA ARRAY USING A PARTIALLY RESHAPED CODEBOOK

(71) Applicant: Telefonaktiebolaget L M Ericsson (publ), Stockholm (SE)

(72) Inventors: Niklas Wernersson, Solna (SE); Svante Bergman, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/895,614

(22) PCT Filed: Nov. 4, 2015

(86) PCT No.: PCT/SE2015/051162
§ 371 (c)(1),
(2) Date: Dec. 3, 2015

(87) PCT Pub. No.: WO2016/024912
PCT Pub. Date: Feb. 18, 2016

(65) Prior Publication Data
US 2017/0126294 A1    May 4, 2017

(51) Int. Cl.
*H04B 7/0456* (2017.01)
*H04B 7/06* (2006.01)
*H04L 5/00* (2006.01)

(52) U.S. Cl.
CPC ......... *H04B 7/0456* (2013.01); *H04B 7/0626* (2013.01); *H04B 7/0639* (2013.01); *H04L 5/0048* (2013.01)

(58) Field of Classification Search
USPC .................. 375/267, 219, 222, 229; 370/329
See application file for complete search history.

(56) References Cited

U.S. PATENT DOCUMENTS 5,852,630 A * 12/1998 Langberg ............ H04L 27/2647
375/219
8,391,392 B2   3/2013 Melzer et al.
(Continued)

FOREIGN PATENT DOCUMENTS

WO        2017039510 A1    3/2017

OTHER PUBLICATIONS

Zhang, Y. et al., "A novel codebook design with the LBG algorithm in precoding systems under spatial correlated channel", 2010 International Conference on Communications, Circuits and Systems (ICCCAS), Jul. 28, 2010, pp. 32-36 , IEEE.
(Continued)

*Primary Examiner* — Eva Puente
(74) *Attorney, Agent, or Firm* — Coats & Bennett, PLLC

(57) ABSTRACT

A transmitting radio node (10) precodes a transmission from an antenna array, which includes antenna elements arranged along at least two axes, using a main codebook which is representable as a Kronecker product of a first codebook and a second codebook, where the first codebook comprises predetermined sub-precoders and the second codebook comprises configurable sub-precoders. A receiving radio node (20) may benefit from adaptive beamforming made possible by the configurability of the main codebook, while still using a stable format, which remains valid also after reconfiguration, for the exchange of reference signals and corresponding feedback information.

31 Claims, 5 Drawing Sheets

(56) References Cited

U.S. PATENT DOCUMENTS

| | | | |
|---|---|---|---|
| 8,494,033 B2* | 7/2013 | Jongren | H04B 7/0617 375/219 |
| 2011/0305263 A1 | 12/2011 | Jöngren et al. | |
| 2013/0229980 A1 | 9/2013 | Wernersson et al. | |
| 2013/0230081 A1 | 9/2013 | Wernersson et al. | |
| 2013/0272263 A1 | 10/2013 | Pi et al. | |
| 2013/0322280 A1 | 12/2013 | Pi | |
| 2014/0016549 A1 | 1/2014 | Novlan et al. | |
| 2014/0050159 A1 | 2/2014 | Frenne et al. | |
| 2014/0098689 A1 | 4/2014 | Lee et al. | |
| 2014/0226702 A1 | 8/2014 | Onggosanusi et al. | |
| 2016/0043789 A1* | 2/2016 | Wang | H04B 7/0469 370/329 |
| 2016/0043791 A1* | 2/2016 | Nam | H04B 7/0482 375/267 |
| 2016/0204842 A1* | 7/2016 | Song | H04L 1/0029 375/267 |
| 2016/0211895 A1* | 7/2016 | Onggosanusi | H04B 7/0404 |
| 2016/0218782 A1* | 7/2016 | Janis | H04W 16/28 |

OTHER PUBLICATIONS

Wang, Y., et al., "Kronecker product-based codebook design and optimisation for correlated 3D channels", Transactions on Emerging Telecommunications Technologies, Published online Dec. 5, 2014, pp. 1225-1234, John Kiley & Sons, Ltd.

Telefonaktiebolaget L M Ericsson (Publ), "Precoding a Transmission From a One-Dimensional Antenna Array That Includes Co-Polarized Antenna Elements Aligned in the Array's Only Spatial Dimension", PCT Application No. PCT/SE2015/050935, filed Sep. 4, 2015, pp. 1-52.

Alcatel-Lucent Shanghai Bell et al., "Proposals for Beamformed CSI-RS based 3D MIMO Transmission Scheme", 3GPP TSG RAN WG1 Meeting #82, Aug. 24-28, 2015, pp. 1-5, Beijing, China, R1-153814.

Catt, "Codebook structure for FD-MIMO", 3GPP TSG RAN WG1 Meeting #82, Aug. 24-28, 2015, pp. 1-6, Beijing, China, R1-153939.

Samsung, "4Tx and 8Tx feedback framework for Rel. 10", 3GPP TSG RAN WG1 Meeting #62, Aug. 23-27, 2010, pp. 1-13, Madrid, Spain, R1-104602.

Samsung, "Performance Evaluation of Class B CSI Reporting", 3GPP TSG RAN WG1 Meeting #82bis, Oct. 5-9, 2015, pp. 1-3, Malmö, Sweden, R1-156100.

Yang, D., et al., "DFT-based Beamforming Weight-Vector Codebook Design for Spatially Correlated Channels in the Unitary Precoding Aided Multiuser Downlink", IEEE International Conference on Communications (ICC), May 23, 2010, pp. 1-5, IEEE, retrieved on Dec. 2, 2015, retrieved from internet: https://www.mysciencework.com/publication/read/2241528/dft-based-beamforming-weight-vector-codebook-design-for-spatially-correlated-channels-in-the-unitary-precoding-aided-multiuser-d#page-null.

Ericsson, et al., "Further Refinements of Feedback Framework", 3GPP TSG-RAN WG1 #60bis, Beijing, China, Apr. 12, 2010, pp. 1-8, R1-101742, 3GPP.

Alcatel—Lucent Shanghai Bell et al., "Consideration on CSI feedback enhancements for high-priority antenna configurations", 3GPP TSG-RAN WG1 #66, Athens, Greece, Aug. 22, 2011, pp. 1-7, R1-112420, 3GPP.

\* cited by examiner

PRECODING A TRANSMISSION FROM A TWO-DIMENSIONAL ANTENNA ARRAY USING A PARTIALLY RESHAPED CODEBOOK

TECHNICAL FIELD

The present application relates generally to transmission precoding, and relates specifically to precoding of a transmission from a two-dimensional antenna array.

BACKGROUND

Precoding a transmission from an antenna array involves applying a net of complex weights to the signals that are to be transmitted from the array's antenna elements, so as to independently control the signals' phase and/or amplitude. This set of complex weights is referred to as a "precoder". The transmitting node conventionally chooses the precoder to match the current channel conditions on the link to the receiving node, with the aim of maximizing the link capacity or quality. If multiple data streams are simultaneously transmitted from the array's antenna elements using spatial multiplexing, the transmitting node also typically chooses the preceder with the aim of orthogonalizing the channel and reducing inter-stream interference at the receiving node.

In closed-loop operation, the transmitting node selects the precoder based on channel state information (CSI) fed back from the receiving node that characterizes the current channel conditions. The transmitting node in this regard transmits a reference signal from each antenna element to the receiving node, and the receiving node sends back CSI based on measurement of those reference signals. Transmission of the reference signals and feedback of the CSI contribute significant overhead to preceding schemes. For example, these reference signals and CSI feedback consume a significant amount of transmission resources, such as time-frequency resource elements in Long Term Evolution (LTE) embodiments.

Known approaches reduce overhead attributable to reference signal transmission by dedicating a reference signal for CSI measurement. LTE Release 10, for example, introduces a CSI Reference Signal (CSI-RS) specifically designed for CSI measurement. Unlike the cell-specific common reference signal (CRS) in previous LTE release, the CSI-RS is not used for demodulation of user data and is not precoded. Because the density requirements for data demodulation are not as stringent for CSI measurement, the CSI-RS can be relatively sparse in time and frequency, thereby reducing the number of transmission resources required for transmitting the CSI-RS.

Known approaches reduce overhead attributable to CSI feedback by limiting the usable precoders to a fixed set of precoders, i.e., a codebook. Each precoder in the codebook is assigned a unique index that is known to both the transmitting node and the receiving node. The receiving node determines the "best" precoder from the codebook, and feeds back the index of that precoder (often referred to as a "preceding matrix indicator", PMI) to the transmitting node as a recommendation (which the transmitting node may or may not follow). Feeding back only an index, in conjunction with other CSI such as the recommended number of data streams (i.e., transmission rank) for spatial multiplexing, reduces the number of transmission resources required for transporting that CSI. This approach therefore reduces CSI feedback overhead considerably as compared to explicitly feeding back complex valued elements of a measured effective channel.

With the expected introduction in LTE Release 13 of a limited number of predetermined codebooks adapted for two-dimensional antenna arrays, there comes a desire to implement efficient adaptability of such codebooks. In particular, a codebook adaptation should preferably avoid one or more of: wasting processing resources at a transmitting end; wasting processing resources at a receiving end; requiring an excessive amount of collected (measured) data to provide a useful result; generating added signaling overhead.

SUMMARY

Accordingly, it is an object of the present invention to propose techniques ensuring greater adaptability of a two-dimensional codebook. In particular, it is an object to propose such techniques with a reasonable demand for processing resources. Yet another object is to propose techniques allowing a partial adaptation of a codebook, wherein processing resources are allocated to adapting some aspects of the codebook while other aspects are left unchanged. The sought-for adaptation techniques may have discernible effects at both a transmitting side and a receiving side of a radio link.

The problem of precoding a transmission from an antenna array with antenna elements arranged along at least two axes is considered. In other words, each antenna element's separation from an origin substantially corresponds to an integer combination of vectors defining said axes. For instance, the antenna array may be described as a finite rectangular or oblique lattice with $N_h \times N_v$ positions, populated with antenna elements in all lattice positions or with one or more empty positions. The transmission is precoded using a main codebook that can be represented as a matrix being a Kronecker product comprising a first codebook and a second codebook, e.g., a Kronecker product of a matrix representing a first codebook and a matrix representing a second codebook and possibly of further Kronecker factors. The first codebook is adapted for an antenna array with antenna elements with $N_h$ elements arranged along a single axis, whereas the second codebook is adapted for an antenna array with $N_v$ antenna elements arranged along a single axis. Due to possible oversampling and other factors, each of the first and second codebooks may comprise more sub-precoders than the respective number of antenna elements it is adapted for (e.g., the number of antenna ports may be greater than or equal to the number of antenna elements $M_v \geq N_v$, $M_h \geq N_h$); yet each of the first and second codebooks contains sub-precoders that are typically labelled by a single index, whereas the precoders of the main codebook may be labelled by a two-dimensional index. It is noted that main codebook adapted for a three- or higher-dimensional antenna array may be represented as a Kronecker product of three or more single-axis codebooks.

In this setting, according to one embodiment, the transmission from the antenna array is precoded using a main codebook representable as a Kronecker product of two or more factors, from which factors a first codebook comprises predetermined sub-precoders and a second codebook comprises configurable sub-precoders. It is envisioned that this embodiment is implemented at a transmitting radio node; a transmitting radio node in this sense may comprise an antenna array and possibly further radio equipment, which are responsible for the actual generation of electromagnetic waves; and associated signal processing equipment. In particular, the first codebook may consist of predetermined sub-precoders (e.g., not dynamically adapted, not configurable after factory setup, not configurable after a general software upgrade) whereas at least some sub-precoders of the second codebook may be modified in connection with maintenance or during operation of the transmitting radio node. For instance, the sub-precoders of the first codebook may be defined without knowledge of local radio conditions at the transmitting node. It is understood that the transmission may further undergo tapering (or other beamforming techniques which are known as such and commonly practiced in the art) before being supplied to the physical antenna elements of the antenna array.

The present embodiment may achieve at least one of the above objectives, as it allows the main codebook to be configured with respect to one of the axes, while robustly and resource-economically leaving it unchanged with respect to the other axis. For instance, the transmitting radio node implementing the embodiment may be a network node, such as a base station deployed in a location where the density of served user equipments (UEs) is uniform in the horizontal direction but has atypical peaks in the vertical dimension, such as may be the case where tall building are present in the base station's vicinity; adaptation to the horizontal UE density in such circumstances is likely to improve system throughput. For instance, the second codebook may be chosen to correspond to a vertical axis of the antenna array and may be designed with a comparatively larger density of sub-precoders corresponding to beams concentrated at and around the peaks of the UE vertical density.

In one embodiment, the transmitting radio node precodes the transmission on the basis of an initially obtained precoded signal, which has been precoded using a codebook representable as a Kronecker product of the first code book and a third codebook. More precisely, the transmitting radio transforms said precoded signal by a linear transformation representable as a Kronecker product including a factor representing a linear mapping from at least a subset of the sub-precoders of the third codebook to the sub-precoders of the second codebook. The third codebook, which is adapted for a single-axis antenna array but is typically distinct from the second codebook, may comprise a greater or equal number of sub-precoders as the second codebook. The sub-precoders of the third codebook may be predetermined, i.e., typically do not reflect local radio conditions at the deployment site of the transmitting radio node. Accordingly, in this embodiment, the main codebook corresponds to the action of the Kronecker product of the first codebook and the third codebook followed by said linear transformation; the main codebook need not be derived or stored explicitly.

Within the preceding embodiment, the linear mapping may define a one-to-one association between the sub-precoders of the second codebook and at least a subset of the sub-precoders of the third codebeek. For instance, the linear mapping may ensure that a component of the precoded signal corresponding to one of the sub-precoders of the third codebook is mapped to a component corresponding to an associated sub-precoder of the second codebook. For example, letting $x_k$ be a normalized component corresponding to a $k^{th}$ sub-precoder of the third codebook and $y_k$ be a normalized component corresponding to a $k^{th}$ sub-precoder of the second codebook ($1 \le k \le M_v$), then for each k and each real or complex scalar $\gamma$, the linear mapping maps a precoded signal containing a component $\gamma x_k$ into a signal containing a component $\gamma y_k$, that is, in an equal proportion.

Alternatively. or additionally, and still within the preceding embodiment, the linear mapping may be equivalent to the joint action of computing inner products with at least a subset of the sub-precoders of the third codebook; and linearly combining the sub-precoders of the second codebook using the computed inner products as weighting factors. In other words, under the linear mapping, inner products between the preceded signal and said subset are computed, and the (scalar-valued) inner products are used as weights in a weighted sum of the sub-precoders of the second codebook. As the skilled person realizes, the linear mapping may proceed in two separate steps, with the set of inner products as an explicit intermediate result (which may be viewed as a selection vector with respect to the sub-precoders of the second codebook), or may be implemented as a single operation, which may then be represented as a matrix. As the skilled person will furthermore realize, the sub-precoders of the third codebook $X^v = \{X_k^v: 1 \le k \le M_v\}$ may not be orthogonal (or may have non-constant modulus), but this may be remedied by selecting an orthogonal subset of $X^v$, e.g., $\{X_k^v: k \in K\}$ with $K \subset [1, M_v]$. For instance, if the third codebook is oversampled (e.g., oversampling by a factor $Q_v$ may cause the third codebook to contain $Q_v N_v$ sub-precoders rather than its number of antenna ports $N_v$), the linear mapping will map a linearly independent subset of the sub-precoders of the third codebook to the sub-precoders of the second codebook. Said subset of the third codebook may consist of normalized vectors $\|X_k^v\| = \alpha > 0$ for all $k \in K$, or may be normalized together with the sub-precoders $B_k$ of the second codebeek, $\|B_k X_k^v\| \alpha > 0$ for all $k \in K$.

Further alternatively or additionally, still within the preceding embodiment, the linear transformation may be represented as a matrix being a Kronecker product that includes a further factor representing an $M_h$-dimensional identity mapping, where $M_h$ is the number of antenna ports of the first codebook. The linear transformation then does not change the precoded signal with respect to that axis of the antenna array to which the first codebook corresponds. Advantageously, there is no need to decompose or project the precoded signal before the linear transformation can be applied.

In one embodiment, the linear transformation defines a one-to-one association between the sub-precoders of the second codebook and at least a subset of the sub-precoders of the third codebook. There is an association in the sense that a component of the precoded signal corresponding to a prototype precoder, which is representable as a Kronecker product including one of the sub-precoders of the third codebook, is mapped to a component corresponding to a precoder of the main codebook; this precoder of the main codebook includes a sub-precoder of the second codebook that is associated with said one sub-precoder of the third codebook.

Within the preceding embodiment, when the antenna array is an $N_h \times N_v$ array or spans an $N_h \times N_v$ array (empty positions allowed, with the proviso that not all positions of an outermost row or column is empty), one may define $N_h N_v$ prototype precoders, each of which is representable as a Kronecker product of a vector from an $N_h$-dimensional basis and a sub-precoder of the third codebook, wherein the sub-precoder is selected from a subset of the third codebook; and embed each of the sub-precoders from the second codebook is into $N_h N_v$-dimensional space by forming a Kronecker product with an $N_h$-dimensional identity mapping. The linear transformation may then be equivalent to the joint action of applying conjugates (e.g., represented in matrix form as hermitian conjugates, or complex-conjugated transposes) of prototype precoders and using the results to combine embedded sub-precoders. Acting on the precoded signal, the linear transformation includes multiplying (left-multiplying) the precoded signal by one or more conjugates of the prototype precoders (e.g., by hermitian conjugates of matrices representing the prototype precoders) and using the products (vectors) as weights to form a weighted sum of the embedded sub-precoders. Again, the linear transformation may be implemented in such manner that the prototype precoders and the embedded sub-precoders are explicitly formed, or may be implemented as a single matrix operation. The linear transformation may be implemented by using a canonical $N_h$-dimensional basis (e.g., axis-aligned vectors of unit length), but this is no essential feature of this embodiment. It is noted that $N_h N_v$ is an upper limit on the number of prototype precoders, also where the third codebook is oversampled, if the constant modulus property is to be preserved.

In one embodiment, the linear mapping is restricted to a subset of linearly independent sub-precoders of the third codebook. More precisely, the linear transformation is constructed in terms of sub-precoders in this subset only, but will be well-defined also for any such sub-precoders outside the subset that can be written as linear combinations of those in the subset. Preferably, the linearly independent sub-precoders are chosen according to a predetermined rule. As an example, assume the third codebook is a grid-of-beams type codebook, entries of which are discrete Fourier transform (DFT) vectors of the form $$X_k^v = \left[ 1 \; e^{j\frac{2\pi k}{N_v Q_v}} \; e^{j\frac{4\pi k}{N_v Q_v}} \; \cdots \; e^{j\frac{2\pi(N_v-1)k}{N_v Q_v}} \right]^T, k = 0, 1, \ldots, N_v Q_v - 1,$$

where $N_v$, $Q_v$ are as previously defined. In this setting, a rule for selecting the linearly independent subset of the third codebook may be to select precoders with indices spaced by the oversampling factor $Q_v$, that is, $\{X_n^v, X_{n+Q_v}^v, X_{n+2Q_v}^v, \ldots, X_{n+(N_v-1)Q_v}^v\}$ for some non-negative $n \le Q_v - 1$. The constant n may be selected on the basis of an LTE-type precoding matrix indicator (PMI) received at the transmitting radio node from a receiving radio node, wherein the PMI recommends use of precoder $X_n^v$. (As used herein, "transmitting" and "receiving" refers to the main downlink direction.) Equivalently, the subset of the third codebook may be selected as a linearly independent subset that comprises the recommended precoder $X_n^v$. The subset may be selected maximal in the sense that it comprises $N_v$ precoders, corresponding to the full dimensionality of the third codebook.

Alternatively or additionally, within the previous embodiment, the selection of the subset of the third codebook may be accompanied by normalization, ensuring that the precoders in the subset have constant modulus, $\|X_k^v\| = \alpha > 0$ for all $k \in K$, where K is the index set of the subset.

In another embodiment, the main codebook is adapted for an antenna array of co-polarized antenna elements.

In one embodiment, the main codebook is adapted for an antenna array comprising sub-elements for controlling polarization of the transmission from the antenna array. The linear transformation, by which the precoded signal is transformed, may then be representable as a Kronecker product comprising a further factor representing an $M_p$-dimensional identity mapping, where $M_p$ is the polarization dimensionality. In particular, the antenna array may consist of cross-polarized antenna elements and the polarization dimensionality may be 2.

In one embodiment, the transmission comprises user data or a reference signal. In particular, the transmission may comprise a channel state information reference signal (CSI-RS). In response to the reference signal, a receiving-side radio node may transmit feedback information indicating to the transmitting radio node radio conditions in respect of the currently used precoder of the main codebook. If reference signals are transmitted for a plurality of different precoders of the main codebook, the receiving radio node may indicate to the transmitting radio node its preference among these, e.g., with the aim of increasing or maximizing a useful signal energy at the receiving radio node in subsequent transmissions. It is noted that if the antenna array has one or more empty lattice positions, these may be treated algorithmically as antenna elements with infinite attenuation (whereas physically, the antenna elements are nonexistent). In particular, the reference signals for such precoders that are not realizable by means of the antenna array (e.g., precoders defining non-zero gain for the empty lattice positions) may be suppressed, so that in effect, the receiving radio node will have no reason to recommend a precoder that is not realizable by the transmitting radio node. Said suppressing may proceed by leaving out the corresponding reference signals, or by transmitting them with zero gain so that a gap arises in a predetermined sequence of reference signals.

In particular, the reference signal may comprise information identifying the precoder of the main codebook currently used, among a range of previously defined precoders. For instance the precoder may be identified by a first index referring to a sub-precoder in the first codebook and a second index k referring to a sub-precoder in the second codebook; the indices may be formatted as one two-dimensional index or an invertible weighted sum of two indices (e.g., $k+\beta l$, with $|\beta| \ge N_v$). Advantageously, the second index k may refer to a sub-precoder in the third codebook even though the transmitting radio node is effectively using a precoder formed as a Kronecker product of a sub-precoder of the first codebook and a sub-precoder of the second codebook. By labelling the precoders in this manner, the configurability of the second codebook is hidden from the receiving radio node. Hence, the partial adaptation of the main codebook may be backward-compatible as far as the receiving radio node is concerned. In particular, in some embodiments, the receiving radio node may receive and respond to the reference signal without knowing that the third codebook has been transformed under the linear mapping discussed above.

In one embodiment, the transmitting radio node configures at least one sub-precoder in accordance with local radio conditions. For instance, one of the sub-precoders of the second codebook may be defined on the basis of radio conditions measured at a deployment site of the transmitting radio node or radio conditions predicted to prevail at the deployment site. To guide its configuring of a sub-precoder in accordance with local radio conditions, the transmitting radio node may collect data indicative of a UE density distribution and compute suitable statistical measures, such as averages, various dispersion measures, higher-order statistics etc. Long-term statistical measures (e.g., based on data collected over one day or more) may relied upon; it is possible to configure the transmitting radio node differently at different times of day or on different days of a week; furthermore, it is possible to apply a temporary configuration in connection with an expected deviation from a normal UE population, such as a public holiday, an event attracting large crowds, an event taking place in an area that is typically not much populated, and the like. Alternatively or additionally, the transmitting radio node may be configured on the basis of a simulation taking into account an expected or known UE population at or near the deployment site, geometry of nearby buildings, main reflections etc. It is advantageous to refrain from overly frequent reconfiguration of the transmitting radio node, because, preferably, the exchange of a reference signal and associated feedback information may need to be repeated to achieve optimal accuracy.

In one embodiment, where the transmitting radio node operates as one of a plurality of stationary nodes (e.g., base stations or other fixed/semi-fixed access nodes) in a radio access network, the first codebook is common to said plurality of stationary nodes, whereas the second codebook is configured independently for the transmitting radio node. Hence, a UE operating in vicinity of a deployment site of the transmitting radio node may experience different precoding compared to when it operates in vicinity of a different transmitting radio node that has been configured differently or is using a default second codebook.

In different embodiments, the axes of the antenna array may either extend in two spatial dimensions or may be spatially parallel. E.g., the axes may be collinear, whereby the antenna array extends in a single spatial dimension with independent controllability for the antenna elements corresponding to each axis. In embodiments where the axes extend in two spatial dimensions, the UE density may be such that it is more advantageous to let the axis with the greatest vertical component (e.g., a vertical or approximately vertical axis) correspond to the second codebook, i.e., the configurable codebook. However, in embodiments where the UE density is typical with respect to a vertical direction but atypical with respect to a horizontal direction, it may have a greater impact on performance to let the axis with the greatest horizontal component correspond to the second codebook, and vice versa. It is furthermore within the scope of this disclosure to precode a transmission using a main precoder representable as a Kronecker product of two configurable codebooks; such an embodiment clearly is computationally more demanding, and may for good accuracy require a more complete set of data regarding local radio conditions, but allows for highly flexible beamforming.

Changing perspective from a transmitting radio node to a receiving radio node (e.g., mobile station or UE), the problem of receiving a transmission from a transmitting radio node (e.g., base station or other fixed/semi-fixed access node) having at its disposal an antenna array with antenna elements arranged along at least two axes is now considered. The antenna array may have one or more of the characteristics outlined earlier in this section. The receiving radio node is operable to be served by a transmitting radio node in a communication network. The receiving radio node receives a first plurality of labelled reference signals from the transmitting radio node and transmits feedback information to the transmitting radio node; the feedback information implicitly or explicitly indicates that a signal quality metric is below a predetermined threshold for all reference signals. (Equivalently, the feedback information may indicate that the reference signals have been received below a minimum performance threshold.) Then, the receiving radio node receives a second plurality of labelled reference signals from the transmitting radio node and transmits feedback information to the transmitting radio node; the feedback information implicitly or explicitly indicates that the signal quality metric is above the threshold for at least one of the reference signals. The receiving radio node then receives a subsequent transmission, to which beamforming associated with one of the reference signals in the second plurality is applied.

As used herein, beamforming associated with one of the reference signals may not necessary imply that the subsequent transmission and the reference signal are identically beamformed. Indeed, beamforming may be done using demodulation reference signals, to which the CSI-RS are not necessarily related. Instead beamforming associated with one of the reference signals may relate to that available beamforming configuration that most closely matches one used for one of the reference signal. For example, it may be possible to derive from the feedback information that a certain one of the reference signals yielded a best value of the signal quality metric; the transmitting radio node may then decide to apply beamforming most closely matching said reference signal.

When communicating with a transmitting radio node according to prior art, a UE may fail to properly estimate the CSI for CSI feedback due to poor signal quality. Poor signal quality may be indicated by a low value of a signal quality metric, such as a channel quality indicator (CQI), or a signal-to-interference-plus-noise ratio (SINR). In implementations, a CQI may be defined in such manner as to be in a predetermined relationship with a SINR, e.g., quantized values of a SINR. With this embodiment, however, the transmitting radio node with which the receiving radio node communicates may take action (e.g. choosing a different precoder or reconfiguring a precoder) to obtain a beamforming gain for the CSI-RS. Such action at the transmitting-node side may be known by the receiving radio node or may be hidden from the receiving radio node, wherein the latter case may be advantageous in view of backward compatibility. The beamforming gain may then make it possible for the UE to estimate the channel and report CSI. This embodiment may thus extend the coverage of a transmitting radio node, such as a radio base station.

In embodiments, a reference signal may be labelled by being transmitted using a predetermined resource (e.g., resource element). The reference signal may alternatively be explicitly labelled in that it comprises an explicit value.

In one embodiment, the respective references signals in the first and second pluralities are received with different beamforming despite being identically labelled. For example, the second plurality may comprise at least one reference signal that is received with a different beamforming than all of the reference signals in the first plurality. In particular, the reference signals in the second plurality may have been precoded using a precoder that is not used for the reference signals in the first plurality.

In one embodiment, the reference signals may be labelled with reference to a predetermined codebook that is used for both the first and second pluralities of reference signals. In fact, at least in a specific mode of operation (e.g., two-dimensional precoding), the predetermined codebook may be common to several transmitting radio nodes in the communication network or several transmitting radio nodes in a specific geographical area where the communication network has been deployed.

In a further development of the previous embodiment, the receiving radio node may receive a codebook restriction indication defining an available subset of the predetermined codebook. The receiving radio node may either note that no reference signals corresponding to the not-available precoders (e.g., precoders not belonging to the available subset of the predetermined codebook) are received, or may alternatively receive such reference signals but refrain from performing measurements thereon and/or from transmitting feedback information with respect to these. To the extent the receiving radio node transmits feedback information recommending one of the precoders for use in subsequent transmissions, it foregoes recommending other precoders than those in the available subset. As explained above, for purposes of said transformation of the precoded signal, it may be advantageous to restrict a codebook that is a Kronecker factor of the main codebook to a subset, in particular to a subset of linearly independent sub-precoders; this may be of assistance in achieving orthogonality and/or constant modulus between the sub-precoders. Due to inherent properties of linear transformations in $N_v$ dimensions (rank $\leq N_v$), the transformed transmission will comprise at most $N_v$ distinct components. Hence, when the receiving radio node receives a codebook restriction indication, it also becomes aware of a restriction undertaken at the transmitting radio node's end, as practiced in at least one of the previously described embodiments.

In a further development of such embodiments where the reference signals are labelled with reference to a predetermined codebook, the receiving radio node may transmit corresponding feedback information in a predetermined format. This supports transparency: a transmitting radio node may reconfigure a codebook by which it precodes transmissions without informing a served receiving radio node. The feedback information may include a precoder which the receiving radio node recommends for subsequent transmissions. The recommendation may take the form of a precoding matrix indicator (PMI) in LTE or a form equivalent thereto.

In one embodiment, the feedback information is expressed in terms of the signal quality metric, e.g., as a measured or estimated value of the signal quality metric for each of the received reference signals. If this is the case, it is not necessary for the receiving radio node to be aware of the threshold on the signal quality metric; instead, it may receive identically labelled reference signals which the transmitting radio node may have precoded using a different precoder that may be superior in current radio conditions. This allows the threshold to be reconfigured at the network side without requiring an update of UEs.

In another embodiment, the feedback information transmitted in response to the first plurality of reference signals comprises a predetermined (or reserved) value indicating that the signal quality metric is below a predetermined threshold for all reference signals. Preferably, the feedback information comprises a single value indicating that all reference signals have been received with insufficient (e.g., below a threshold) signal quality. In this embodiment, the feedback information transmitted in response to the second plurality of reference signals may however be expressed in terms of the signal quality metric. In this embodiment, furthermore, the reference signals in the second plurality may be identically or differently labelled. In fact, the receiving radio node's feedback explicitly indicating that all reference signals have been received with insufficient signal quality may be regarded as a request to the transmitting radio node to reconfigure its beamforming.

Embodiments herein further include corresponding apparatus, computer programs, and computer program products. Unless specifically discussed, these generally share characteristics and advantages with their method counterparts.

In particular, one embodiment provides a transmitting radio node with an antenna having an antenna array with the characteristics described above and a precoding module adapted to precode a transmission using a main codebook, which is representable as a Kronecker product of a first codebook and a second codebook, prior to transmitting the transmission using the antenna array. According to this embodiment, the transmitting radio node further comprises a configuration interface for configuring the second codebook. This embodiment allows the main codebook to be configured with respect to one of the axes without necessarily changing it with respect to the other axis. This ensures robustness and economy of resources. As described above, the configurability may be put to use for adapting the main codebook to actual local radio conditions, in particular to a known or expected UE density. As also noted above, the transmitting radio node may be a functional unit of inter-working modules deployed in distinct locations, such as radio equipment responsible for the actual generation of electromagnetic waves and associated signal processing equipment.

In an embodiment, the first codebook, being one of the Kronecker factors of the main codebook, is predetermined. For instance, the first codebook may be stored in a memory at the transmitting node as part of factory setup or a general software upgrade (a general software upgrade may be provided to the operator by a manufacturer or his agent, and may be common to all transmitting nodes of the same type). In particular, the first codebook may be exempt from operator maintenance. Accordingly, the transmitting radio node uses a codebook with a single Kronecker factor that is configurable while one or more further Kronecker factors are not configurable.

In one embodiment, there is provided a receiving radio node operable in a communication network and operable to be served by a transmitting radio node, which comprises an antenna array including antenna elements arranged along at least two axes. The receiving radio node comprises an antenna array including a plurality of antenna elements and a processor. The processor may be configured: to receive a first plurality of labelled reference signals from the transmitting radio node; to transmit feedback information to the effect that a signal quality metric is below a predetermined threshold for all reference signals; to receive a second plurality of labelled reference signals from the transmitting radio node; transmit feedback information to the effect that the signal quality metric is above the threshold for at least one of the reference signals; and to receive a subsequent transmission with beamforming associated with (in the sense explained above) one of the reference signals in the second plurality. The receiving radio node may become aware of a change in beamforming by virtue of the plurality of antenna elements with which it is equipped.

It is recalled that the invention relates to all combinations of features, even if these are recited in mutually different claims.

BRIEF DESCRIPTION OF THE DRAWINGS

Embodiments of the invention will now be described in greater detail with reference to the accompanying drawings, on which.

Unless otherwise indicated, the drawings show only such elements that are vital to the comprehension of the invention, whereas other elements may be implied or merely suggested.

DETAILED DESCRIPTION

Figure 1:
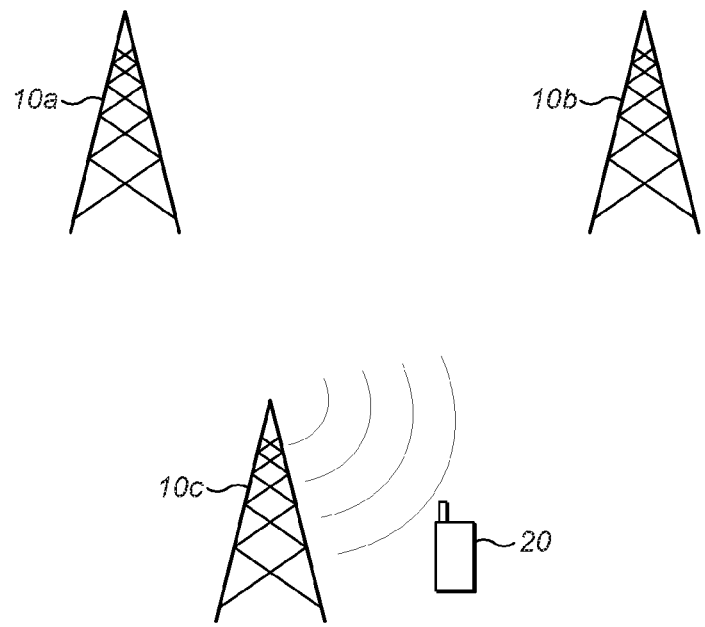
FIG. 1 illustrates a communication network comprising a plurality of network nodes and at least one mobile station.

FIG. 1 is a schematic overview of a radio communication network. In today's available communication networks, a number of different technologies are used, such as LTE, Wideband Code Division Multiple Access (WCDMA), Global System for Mobile Communications/Enhanced Data rates for GSM Evolution (GSM/EDGE), Worldwide Interoperability for Microwave Access (WiMax), Ultra Mobile Broadband (UMB) etc. In the communication network shown, three network nodes 10 (symbolized by base stations) provide radio coverage in respective geographical areas, from which a UE 20 is currently served by the third network node 10c and communicates with this. The UE 20 transmits data over an air interface (or radio interface) to the network node 20 in uplink transmissions, and the network node 10c transmits data over an air or radio interface to the UE 10 in downlink transmissions. In a representative scenario, the UEs served by a network node are distributed evenly with respect to the azimuth angle and are concentrated at the horizon with respect to the elevation angle.

Figure 3:
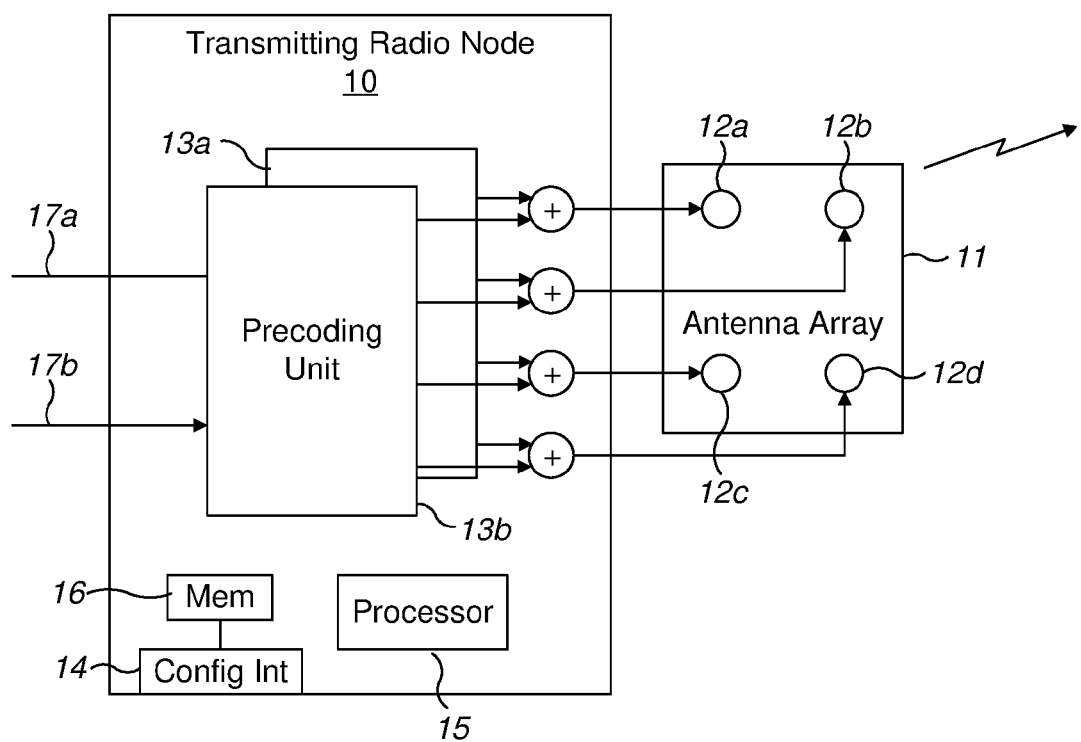
FIG. 3 illustrates a transmitting radio node equipped with an antenna array.

FIG. 3 depicts a transmitting radio node 10 (e.g., an enhanced Node B in LTE embodiments) adapted to transmit from an associated antenna array 11. In the figure, the array 11 comprises four antenna elements 12 arranged as a two-dimensional 2×2 array. The array 11 may for example include co-polarized or cross-polarized antenna elements. The transmitting radio node 10 may as well use the antenna array 11 for the purpose of receiving transmissions (uplink).

FIG. 4 illustrates a number of alternative antenna array configurations. As symbolically indicated, each circle may symbolize either a single (polarized) antenna element or a pair of antenna sub-elements allowing independent control of the polarization of an electromagnetic wave emitted by the antenna element. FIG. 4A illustrates a rectangular antenna array generated by basis vectors $\bar{e}_h$, $\bar{e}_v$ (not shown) of unequal length and comprising unequal numbers of elements per dimension, $N_h \neq N_v$.

Figure 4A:
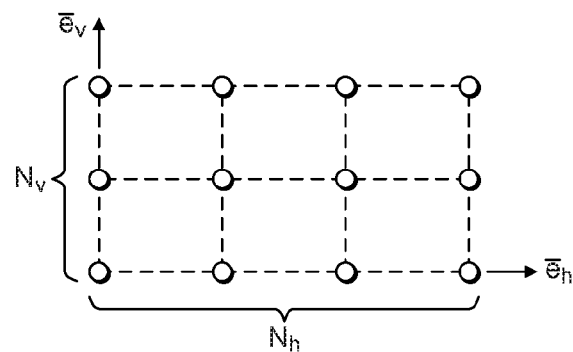
FIG. 4 illustrates various antenna array layouts.
Figure 4B:
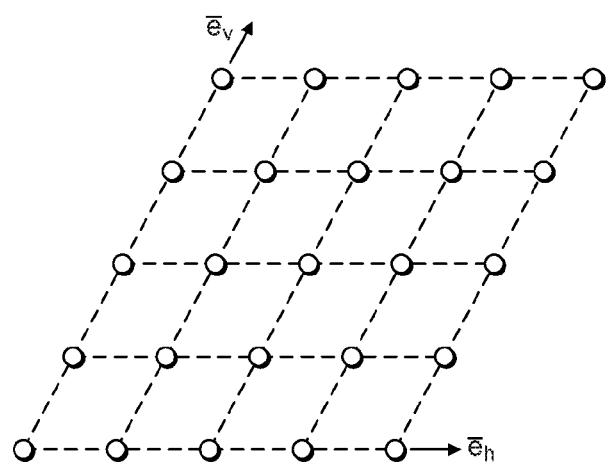
Figure 4C:
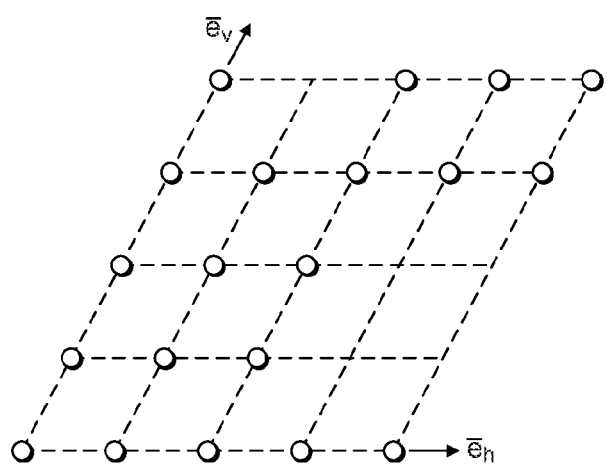

FIG. 4B illustrates an oblique antenna array generated by non-orthogonal basis vectors. The antenna array of FIG. 4C spans the oblique antenna array illustrated in FIG. 4B but includes several empty lattice positions. The absence of antenna elements in these positions may require removal from the main codebook (or at least inactivation by other means, as explained above) of some precoders that would have been suitable for use with the antenna array of FIG. 4B.

Figure 4D:
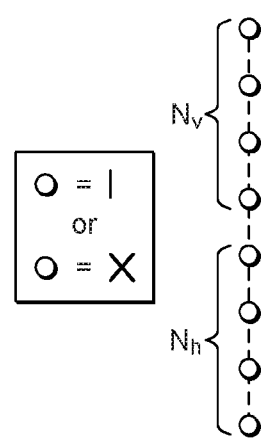

FIG. 4D finally shows a one-dimensional array where the upper $N_v$ antenna elements are controllable independently of the lower $N_h$ antenna elements. Such an antenna array may be described as one where the antenna elements are arranged along two spatially parallel axes. It therefore lends itself very well to the preceding techniques disclosed herein. In other words, it is no essential feature of the invention that the axes along which the antenna elements are arranged extend in two spatial dimensions.

The transmitting radio node 10 is configured to transmit an electromagnetic wave from the antenna array 11 to a receiving radio node (not shown). The transmission, in some embodiments, may comprise user data and/or a reference signal dedicated to the receiving radio node (e.g., a UE-specific reference signal or a Demodulation Reference Signal in LTE embodiments). The transmitting radio node 10 is configured to precode this transmission. FIG. 3 depicts the transmitting radio node 10 in this regard as including a processor 15 and one or more precoding units 13a, 13b, respectively configured to perform precoding for one or more simultaneously transmitted information streams (i.e., layers) 17a, 17b carrying payload data, signaling, reference signals or the like. In the example shown, the first and second precoding units 13a, 13b perform precoding of information streams 17a, 17b, respectively. When more than one information stream 17a, 17b is transmitted (i.e., the outgoing transmission is a multi-stream transmission), the precoded information streams that are output from the precoding units 13a, 13b and that are destined for transmission from a same antenna element 12 are combined in the adder module and supplied to the destination antenna element 12. In at least some multi-stream embodiments, the transmitting radio node 10 performs the same precoding for each of the multiple streams 17a, 17b. In one embodiment, the transmitting radio node 10 may however perform a fixed unitary rotation of the streams 17a, 17b (not shown) prior to precoding.

Irrespective of whether the transmission is a single-stream or multi-stream transmission, the transmitting radio node 10 according to embodiments herein advantageously precodes the transmission using a main codebook representable as a Kronecker product of a predetermined first codebook $X^h = \{X_k^h: 1 \leq k \leq M_h\}$, which is adapted for a one-dimensional antenna array with two elements (horizontal projection of the actual antenna array 11), and a configurable second codebook $B = \{B_l: 1 \leq l \leq M_v\}$, which is adapted for a one-dimensional antenna array with two elements (vertical projection of the actual antenna array 11). As discussed above, the number of ports $M_h$, $M_v$ of each codebook may differ from the number of antenna elements which it has been designed for. The two codebooks may be stored in memory 16. By means of configuration interface 14, at least the second codebook B is configurable. In order to precode a transmission, the precoding unit(s) 13a, 13b may retrieve the first and second codebooks, or the main codebook, from the memory 16.

If for simplicity polarization is disregarded, the main codebook of the transmitting radio node 10 shown in FIG. 3 will be of the form $X^h \otimes B = \{X_k^h \otimes B_l : 1 \leq k \leq N_h, 1 \leq l \leq N_v\}$, where $X_k^h$, $B_l$ are column vectors of length 2 and $\oplus$ denotes Kronecker multiplication. The Kronecker product of two matrices A, B is given by:

$$A \otimes B = \begin{bmatrix} a_{11} & \cdots & a_{1n} \\ \vdots & \ddots & \vdots \\ a_{m1} & \cdots & a_{mn} \end{bmatrix} \otimes B = \begin{bmatrix} a_{11}B & \cdots & a_{1n}B \\ \vdots & \ddots & \vdots \\ a_{m1}B & \cdots & a_{mn}B \end{bmatrix}.$$

Accordingly, for FIG. 3, the elements of the main codebook are column vectors of length 4. This holds true if the antenna elements 12 are co-polarized. If instead the antenna elements include respective sub-elements enabling variable polarization, as may be the case when the antenna array 11 consists of cross-polarized antenna elements 12 allowing two independent polarizations, then the main codebook includes a further Kronecker factor corresponding to polarization and will be of the form $I_2 \otimes X^h \otimes B$, where $I_2$ denotes the 2×2 identity matrix. With reference to FIG. 3, when the antenna elements include sub-elements for controlling the outgoing transmission's polarization, each connection line between an adder module and an antenna element 12 may symbolize a dual signal path allowing independent control of the antenna sub-elements.

It is understood that the precoding unit(s) 13a, 13b may further process the transmission by tapering or some other beamforming operation before supplying it to the antenna array 11.

It is further understood that co-phasing of the transmission layers may be applied. For instance, a rank-1 transmission can be done over the two polarizations by transmitting the same data stream over both layers with a relative phase shift to co-phase the layers. Similarly, a rank-2 transmission may be co-phased on the two layers by means of a unitary 2×2 rotation matrix.

A network node equipped with an antenna array whose antenna elements are arranged in two spatial dimensions may be capable of directing its transmissions with respect to an elevation angle and an azimuth angle independently. Still, in view of the representative scenario outlined above in this section, a default codebook containing a large number of horizon-centered precoders (for different azimuth angles) may be much sparser for off-horizon elevation angles; if the UE density distribution differs from the representative scenario, the network node may repeatedly need to choose precoders that are suboptimal from the point of view of received signal energy and/or user separation.

Figure 2:
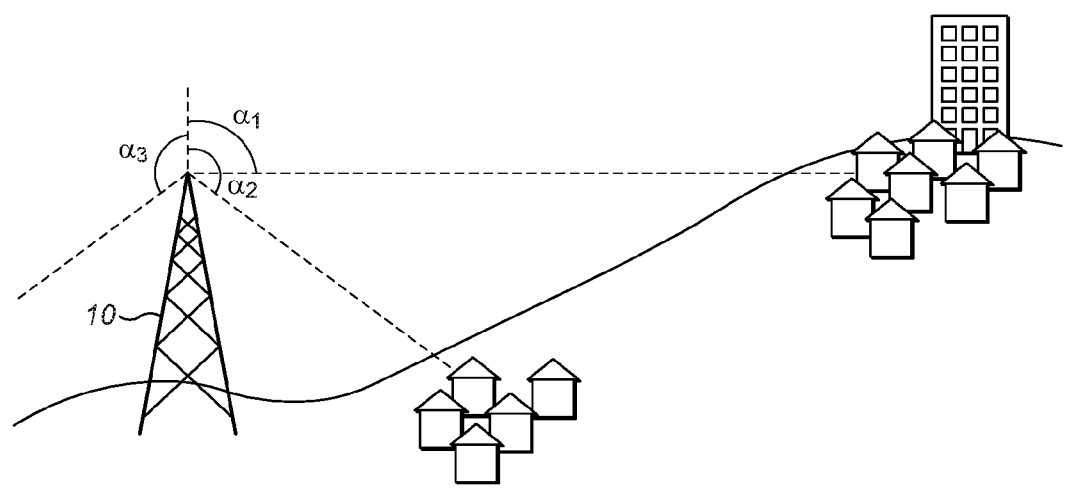
FIG. 2 illustrates deployment of a network node in a populated area.

As an example, FIG. 2 illustrates a deployment scenario in a populated area, where buildings are concentrated in two locations corresponding to specific values $\alpha_1$ and $\alpha_2$ of an elevation angle with respect to the network node 10. The UE density may be expected to be relatively higher at these elevation angles than, say, in the unpopulated area corresponding to elevation $$\frac{1}{2}(\alpha_1 + \alpha_2).$$

For elevation $\alpha_3$ and other elevations pointing into the not-drawn area left of the network node 10, a corresponding analysis can be conducted to determine whether further preferred angles exist. The analysis may be proceed either (a posteriori) based on measurements made during operation or (a priori) by predicting the UE density in view of where buildings, roads, railroads etc. are located. It is noted that the a posteriori approach may be relatively more straightforward and/or less error-prone, since complicated reflection effects are immediately accounted for. When no such analysis can be conducted, one may resort to the representative scenario outlined above, favoring the horizontal elevation, when a codebook for the left-side area is to be designed.

In possible implementations, the transmitting radio node 10 generates the preceded transmission $\tilde{x}$ by initially obtaining (e.g., receiving or generating) a precoded signal x, which has been preceded using a codebook representable as a Kronecker product of the first codebook and a third codebook, and applying a linear transformation Z to the precoded signal. Hence, the preceded transmission is given as $\tilde{x} = Zx$, where Z includes a linear mapping from at least a subset of sub-precoders of the third codebook to the sub-precoders of the second codebook. Two example ways of deriving the linear transformation Z will be now be described.

In a first embodiment, a two-dimensional Kronecker structured codebook designed for a two-dimensional antenna is transformed into a hybrid beam-selection codebook with beam-selection in the vertical dimension and codebook based beamforming in the horizontal dimension. Consider a two-dimensional antenna array of cross-polarized antenna elements, that is, an antenna with a factor 2 antenna elements in the polarization dimension ($M_p=2$), a factor $N_h$ horizontal antenna elements, and a factor $N_v$ vertical antenna elements. This gives in total $2N_hN_v$ antenna elements. For simplicity, it is assumed that one antenna element correspond to one antenna port.

Assuming a ($M_h$, $M_v$) Kronecker-structured codebook was used to produce the preceded signal x, though targeting a different two-dimensional antenna array or a default array of cross-polarized antenna elements. In that codebook, the two-dimensional precoder weight vector $X^{N_v k+l}$ is formed as $$X^{N_v k+l} = X_k^h \otimes X_l^v.$$

In order to alter the beamforming vectors, the following virtualization is introduced:

$$\tilde{Z}(I_{M_h} \otimes B_v)(I_{M_h} \otimes \tilde{U}_v^H) = I_{M_h} \otimes B_v \tilde{U}_v^H,$$

where $I_{M_h}$ is the identity matrix of dimension $M_h$, $\tilde{U}_v^H$ denotes the hermitian conjugate of a matrix consisting of up to $M_v$ orthogonal columns selected from the vertical ("third") codebook $X^v = \{X_l^v: 1 \leq l \leq M_v\}$, and finally $B_v$ is the vertical beam matrix that defines the desired selection beams in its columns. That is, the matrix $B_v$ has $N_v$ rows and $M_v$ columns, and each column is a desired beam selection weight vector, corresponding to a precoder from the "second codebook". The factor $I_{M_h} \otimes \tilde{U}_v^H$ may be regarded as a selection matrix with the purpose of transforming the original codebook to a selection codebook, and $I_{M_h} \otimes B_v$ as the beam matrix with the purpose of performing the beamforming given the selected columns. Put differently, the action of $B_v \tilde{U}_v^H$ may be described as an inner product with the sub-precoders of the third codebook followed by a linear combination of the sub-precoders of the second codebook. The sub-precoder of the third codebook represented by a $k^{th}$ column of $\tilde{U}_v$ is associated with the sub-precoder of the second codebook represented by a $k^{th}$ column of $B_v$:

Due to the structure of matrix $\tilde{U}_v$, which consists of orthogonal columns taken from the vertical sub-codebook, whenever one such vertical sub-precoder is applied, the vertical sub-precoder will be transformed to the corresponding column in the beam selection matrix $B_v$, effectively transforming the vertical dimension of the two-dimensional codebook into a beam selection codebook. Note also that the horizontal dimension remains intact and its part is still codebook-based.

In order to take the polarization dimension into account, the virtualization is concatenated to form a dual polarized matrix, as per:

$$Z = \begin{bmatrix} \tilde{Z} & 0 \\ 0 & \tilde{Z} \end{bmatrix} = I_2 \otimes \tilde{Z}$$

where the upper left submatrix maps to antenna elements of one polarization and the lower right maps to the other polarization.

After applying the port-to-antenna element mapping described by the virtualization, $\tilde{x} = Zx$, and letting each row map to one physical antenna element, the signal vector x represents the antenna ports seen from the UE defined by a vector of reference signals, e.g. CSI-RS. This is to say, the CSI-RS may be virtualized using virtualization matrix Z: based on the CSI reported from the UE, the transmitted data signals are then precoded based on the ($M_h$, $M_v$) precoder codebook and subsequently virtualized using mapping Z before being passed on to the physical antenna ports.

A second embodiment illustrates the use of a two-dimensional codebook with a two-dimensional antenna array that adjusts the beam directions of the codebook and/or converts the codebook from one particular antenna array size to a different size. Considered is more precisely a two-dimensional antenna array of cross-polarized antenna elements ($M_p$=2) with $N_h$ horizontal antenna elements and $N_v$ vertical antenna elements, assuming that one antenna element corresponds to one antenna port.

It is assumed that the precoded signal x was produced using a ($M_h$, $M_v$) two-dimensional Kronecker-structured codebook targeting a two-dimensional antenna array of cross-polarized antenna elements ($M_p$=2), arranged as $M_v$ horizontal antenna elements and $M_h$ vertical antenna elements. Like the previous embodiment, it is possible to handle the case where $N_v \neq M_v$, that is, where the codebook may not be intended for said antenna array. Within this codebook, a two-dimensional precoder $X^{N_v,k+l}$ is formed as $$X^{N_v,k+l} = X_k^h \otimes X_l^v,$$

where the vertical sub-precoders $X_l^v$ may be realized as oversampled DFT beams with an oversampling factor $Q_v$. The following virtualization (transformation of the CSI-RS) is introduced $$Y^{N_v,m+l} = u_m \otimes X_l^v,$$

where m=1, ..., $N_h$ and $u_m$=(0, ..., 0, 1, 0, ..., 0) is the $M^{th}$ $N_h$-dimensional unit vector. For some fixed n ∈ [0, $Q_v$−1], one considers the index set $\Gamma_n$={(l, m): l=n, n+$Q_v$, n+2$Q_v$, ..., n+($N_v$−1)$Q_v$ and m=1, ..., $N_h$}. For instance, $\Gamma_0$ generates the following virtualizations, which will be referred to as prototype precoders:

$$Y^{N_v}, Y^{2N_v}, \ldots, Y^{N_v N_h}, Y^{N_v+Q_v}, Y^{2N_v+Q_v}, \ldots, Y^{N_v N_h+Q_v},$$
$$Y^{N_v+(N_v-1)Q_v}, Y^{2N_v+(N_v-1)Q_v}, \ldots, Y^{N_v N_h+(N_v-1)Q_v},$$

A calculation shows that if ($l_1$, k), ($l_2$, m) ∈ $\Gamma_n$, then $$(X^{N_v,k+l_1})^H Y^{N_v,m+l_2} = (X_k^h \otimes X_{l_1}^v)^H (u_m \otimes X_{l_2}^v) = (X_k^h)^H u_m (X_{l_1}^v)^H X_{l_2}^v,$$

which vanishes if $l_1 \neq l_2$ and is otherwise equal the conjugate of the $m^{th}$ element of $X_k^h$ scaled by a factor $\alpha = (X_{l_2}^v)^H X_{l_2}^v$ by the constant modulus property.

One forms a matrix having as columns the prototype precoders with indices in $\Gamma_0$:

$$\tilde{U} = [Y^{N_v}, Y^{2N_v} \ldots Y^{N_v N_h} Y^{N_v+Q_v} Y^{2N_v+Q_v} \ldots Y^{N_v N_h+Q_v}$$
$$Y^{N_v+(N_v-1)Q_v} Y^{2N_v+(N_v-1)Q_v} \ldots Y^{N_v N_h+(N_v-1)Q_v}]$$

Applying the hermitian conjugate of this matrix to one of the precoders by which the precoded signal was formed, one obtains:

$$\tilde{U}^H X^{N_v,k+l} = \alpha[0\ 0\ 0\ \ldots X_k^h(1)\ X_k^h(2) \ldots X_k^h(N_h)\ 0\ 0$$
$$0 \ldots 0\ 0\ 0]^T$$

if l ∈ {0, $Q_v$, 2$Q_v$, ..., ($N_v$−1)$Q_v$}. Hence, the matrix $\tilde{U}$ will act as a selection matrix, in the sense that the index l in $X^{N_v,k+l}$ will decide where non-zero values in $\tilde{U}^H X^{N_v,k+l}$ are to be located, and these non-zero values will in turn correspond only to the $X_k^h$ part of the codebook. More precisely, the act of left-multiplying by $\tilde{U}^H$ returns $N_v$ blocks of $N_h$ entries each; each block corresponds to one of the horizontal sub-precoders but scaled in proportion to that vertical sub-precoder's contribution to the precoded signal. Each block acts as weight for the associated sub-precoder of the second codebook.

Now define $$U = \begin{bmatrix} \tilde{U} & 0 \\ 0 & \tilde{U} \end{bmatrix}$$

as well as a set of $N_v$ beamforming vectors $$b_q = \begin{bmatrix} b_{1,q} \\ b_{2,q} \\ \vdots \\ b_{N_v,q} \end{bmatrix}, q = 1, \ldots, N_v,$$

which are embedded into $N_v N_h$ dimensions to populate the columns of a beamforming matrix $$\tilde{B} = [I_{N_h} \otimes b_1 I_{N_h} \otimes b_2 \ldots I_{N_h} \otimes b_{N_v}],$$

where $I_{N_h}$ is the identity matrix of size $N_h \times N_h$. The ordering of the columns defines a one-to-one-association between the sub-precoders of the second and third codebooks. The beamforming matrix is concatenated to form a dual polarized matrix of beamforming vectors $$B = \begin{bmatrix} \tilde{B} & 0 \\ 0 & \tilde{B} \end{bmatrix}.$$

The concatenated matrix represents a port-to-antenna element mapping described by $$\tilde{x} = Zx = BU^H x,$$

where each row corresponds to one antenna element. Effectively, while the signal x was created from an data symbol vector S using the ($M_h$, $M_v$) codebook, the transformed signal will have similar properties as if it had been created from the data symbol vector S using the main codebook from the outset.

Hence, based on a two-dimensional codebook designed for a certain antenna array size and consisting of Kronecker products of DFT beams, the two embodiments may enable configurable beamforming. For instance, arbitrary beam shapes are possible, such as non-DFT beams, as is a change of antenna array size.

The approaches according to the first and second embodiments discussed above return equivalent transformation matrices Z.

In both the first and second embodiments, the configurability is applied to the Kronecker factor representing the vertical codebook. While this is the dimension where codebook reconfiguration most often is useful and justified, the invention may be utilized to reconfigure a Kronecker factor representing a horizontal codebook or a codebook corresponding to an arbitrary spatial direction along which antenna elements of the antenna array are arranged.

Figure 5:
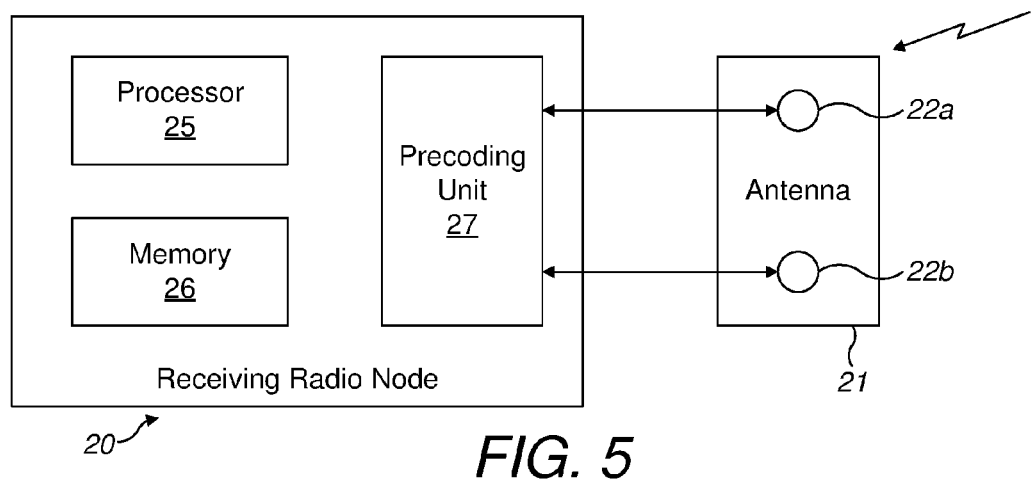
FIG. 5 illustrates a receiving radio node.

FIG. 5 illustrates a receiving radio node 20 adapted to operate in a wireless communication network, e.g., as mobile station or UE. The receiving radio node 20 comprises an antenna 21 enabling communication over an air or radio interface with other nodes in the communication network.

For purposes of illustration, the antenna 21 has been drawn as a 2×1 antenna array with two antenna elements 22a, 22b and a corresponding precoding unit 27. This feature is by no means essential, but the invention may as well be practiced using a single antenna element. The receiving node 20 further comprises a processor 25 and a memory 26.

As suggested in FIG. 1, the receiving radio node 20 is operable to be served by different transmitting radio nodes 10a, 10b, 10c in the communication network and may be associated with one providing the most favorable channel conditions at a given point in time. The receiving radio node 20 may receive reference signals (e.g., CSI-RS in LTE) associated with different available precoders. The reference signals may be labelled, such as by carrying information explicitly identifying the precoder used, or by appearing in a predetermined sequence. Example feedback information from the receiving radio node 20 includes an indication of the receiving signal power for each precoder, an indication of a best precoder (e.g., precoder recommendation, such as PMI), an indication of several best precoders, an indication of precoders fulfilling a minimum performance threshold.

In one embodiment, the receiving radio node 20 receives, when being served by different transmitting radio nodes, reference signals that are identically labelled but differently beamformed. For instance, the reference signals may have been precoded using different precoders. At least if the receiving radio node 20 is equipped with an antenna array, as shown in FIG. 5, it will be able to detect a difference in beamforming by considering phase shifts between antenna elements 22. Beamforming measurements typically do not form part of the feedback information from the receiving radio node 20, since this is normally known at the transmitting end. Because the reference signals are identically labelled, making reference to a codebook that is common to a plurality of transmitting radio nodes in the communication network, the receiving radio node 20 need not be aware of any beamforming actions taken at the transmitting side in order to provide it with required feedback information.

Hence, the receiving radio node 20 may benefit from codebook configurability without sacrificing backward compatibility: it may receive reference signals labelled with reference to a predetermined codebook common to several transmitting radio nodes of the communication network and/or it may transmit feedback information in a predetermined format common to said nodes.

Figure 6:
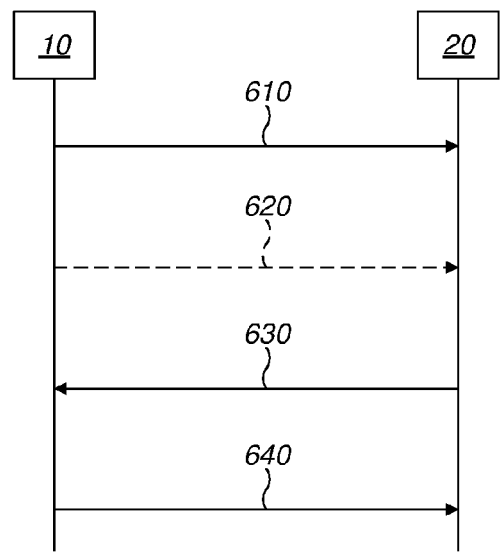
FIG. 6 is a signaling diagram illustrating communication between a transmitting radio node and a receiving radio node.

Reference is now made to FIG. 6, which illustrates an example exchange of communications between a transmitting radio node 10 and a receiving radio node 20. The communicating entities may have same or similar characteristics as above. In a first step 610, the transmitting radio node 10 transmits a plurality of reference signals, such as CSI-RS. The reference signals may be labelled explicitly or may appear in a predetermined sequence. In a second step 620, the transmitting radio node 10 optionally transmits a restriction indication, informing the receiving radio node 20 that one or more reference signals will be omitted or correspond to unavailable precoders. In the latter case, where the restriction indication indicates omission of a reference signal, it may be transmitted prior to the first step 610, thereby implying a deviation from a predetermined sequence of reference signals. As a further variation, which is applicable in the case where each reference signal is explicitly labelled, the restriction indication may simply correspond to the transmitting radio node's act of omitting any reference signals outside the restriction, so that they will effectively be received with zero gain. In a third step 630, the receiving radio node 20 transmits feedback information making reference to one or more of the precoders to which the reference signals correspond. In a fourth step 640, the transmitting radio node 10 initiates a subsequent transmission (e.g., other than a reference signal) while using a precoder that has been selected from the main codebook on the basis of the feedback information from the receiving radio node 20.

Figure 7:
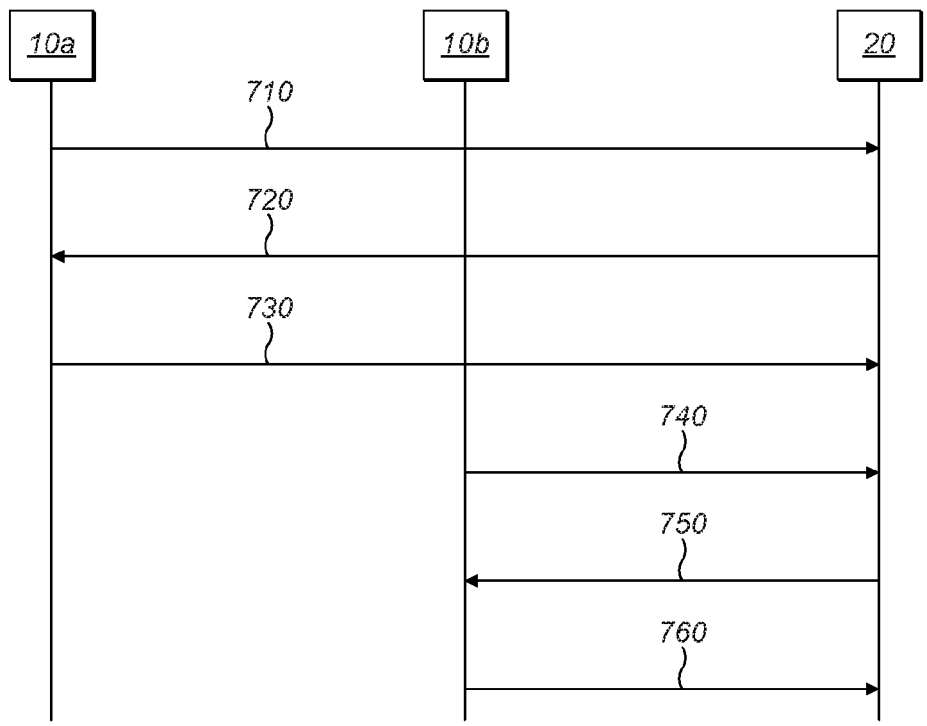
FIG. 7 is a signaling diagram illustrating communication between a receiving radio node and each of a first and a second transmitting radio node.

FIG. 7 illustrates an example exchange of communications between two transmitting radio nodes 10a, 10b and a receiving radio node 20. The communicating entities may have same or similar characteristics as above. The first, second and third steps 710, 720, 730 are performed while the receiving radio node 20 is served by a first transmitting radio node 10a. In the first step 710, the first transmitting radio node 10a transmits a plurality of reference signals. The reference signals may be labelled explicitly or may appear in a predetermined sequence or at predetermined transmission resource. In the second step 720, the receiving radio node 20 transmits feedback information making reference to one or more of the precoders to which the reference signals correspond. In the third step 730, the first transmitting radio node 10a initiates a subsequent transmission using a precoder that has been selected from the main codebook on the basis of the feedback information from the receiving radio node 20.

The receiving radio node 20 then moves out of the primary coverage area of the first transmitting radio node 10a and starts being served by the second transmitting radio node 10b. It is assumed that the second transmitting radio node 10b, having made use of codebook configurability in the sense discussed above, applies at least partially different beamforming than the first transmitting radio node 10a.

In the fourth step 740, the second transmitting radio node 10b transmits a plurality of reference signals. The reference signals may be labelled explicitly or may appear in a predetermined sequence. In the fifth step 750, the receiving radio node 20 transmits feedback information making reference to one or more of the precoders to which the reference signals correspond. In the sixth step 760, the second transmitting radio node 10b initiates a subsequent transmission using a precoder that has been selected from the main codebook on the basis of the feedback information from the receiving radio node 20.

Even though, as noted, the two transmitting radio nodes 10a, 10b apply different main codebooks, the communications in steps 710 and 740 may nevertheless comprise at least one identically labelled reference signal and/or the feedback transmitted in steps 720 and 750 may both refer to the identically labelled reference signal. For instance, if the feedback information indicates all reference signals fulfilling a minimum performance threshold at the receiving side and the at least one identically labelled reference signal fulfils this threshold for both the first 10a and second 10b transmitting radio node, then the receiving radio node 20 refers to the at least one identically labelled reference signal in both communications in steps 720 and 750. Because in fact the beamforming differs, at least in part, between the two transmitting radio nodes 10a, 10b, the subsequent transmissions in steps 730 and 760 will however be transmitted using different configurations of the antenna array. A similar scenario is if course possible if the feedback information indicates the receiving radio node's 20 preferred reference signal or recommended reference signal.

Figure 8:
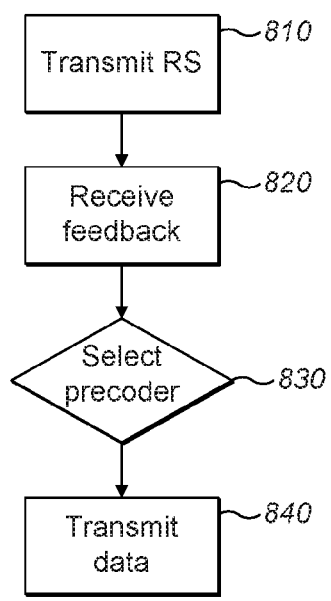
FIG. 8 is a flowchart of a method in a transmitting radio node.

FIG. 8 illustrates a method implemented in a transmitting radio node 10. In a first step 810, the transmitting radio node 10 transmits a plurality of reference signals, each being precoded using a different precoder. In a second step 820, the transmitting radio node 10 receives feedback information relating to the reference signals. The feedback information may originate from a receiving radio node 20. At decision point 830, the transmitting radio node 10 selects a precoder while considering the feedback information. In a third step 840, the transmitting radio node 10 transmits a subsequent transmission precoded using the selected precoder.

Figure 9:
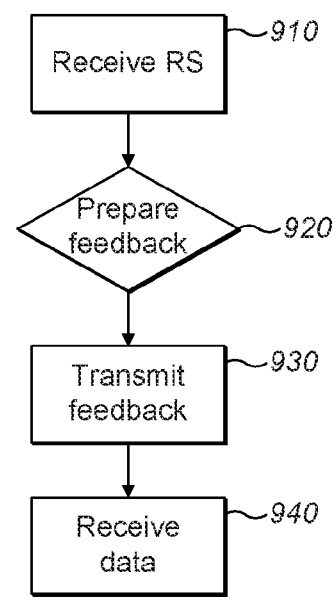
FIG. 9 is a flowchart of a method in a receiving radio node.

FIG. 9 illustrates a method implemented in a receiving radio node 20. In a first step 910, the receiving radio node 20 receives a plurality of reference signals. At decision point 920, the receiving radio node 10 assesses the signal quality (useful signal power, signal-to-noise ratio, error rate etc.) of the reference signals and prepares feedback information relating to the reference signals reflecting this assessment. In particular, the assessment may be a selection of a reference signal having such characteristics that its beamforming is preferred by the receiving radio node 20 for subsequent communications. In a second step 930, the receiving radio node 20 transmits the prepared feedback information. In a third step 940, the receiving radio node 20 receives a subsequent transmission precoded using a same radio configuration as one of the reference signals received initially. In particular, the subsequent transmission may be precoded with the beamforming which the feedback information indicated as preferred.

In a variation to the method illustrated in FIG. 9, the first 910, second 920 and third 930 steps repeat in sequence in circumstances where the signal quality has been found insufficient for all reference signals received at the first execution of the first 910 step. Then, the subsequent transmission in the third step 940 is precoded with the beamforming of one of the reference signals received at the second execution of the first 910 step. In this variation, the receiving radio node 20 may transmit its feedback information in terms of a signal quality metric; a specific indication that the quality of all received reference signals has been found insufficient may also be transmitted as feedback information.

Note that although terminology from 3GPP LTE has been used in this disclosure to exemplify embodiments herein, this should not be seen as limiting the scope of the embodiments to only the aforementioned system. Other wireless systems, including WCDMA, WiMAX, UMB and GSM, may also benefit from exploiting embodiments herein.

Note that the transmitting radio node 10 and receiving radio node 20 herein may correspond to any pair of nodes configured to transmit radio signals and otherwise interact in the way described. In one embodiment, though, the transmitting radio node 10 comprises a base station (e.g., an eNodeB in LTE) or a relay node, whereas the receiving node 20 comprises a wireless communication device (e.g., a UE in LTE). Terminology such as eNodeB and UE should be considering non-limiting and does in particular not imply a certain hierarchical relation between the two. Furthermore, while this disclosure focuses on wireless transmissions in the downlink, embodiments herein are equally applicable in the uplink when the node transmitting in the uplink is associated with an antenna array and supporting processing functionalities.

In some embodiments a non-limiting term UE is used. The UE herein can be any type of wireless device capable of communicating with a network node or another UE over radio signals. The UE may also be a radio communication device, target device, device to device (D2D) UE, machine-type UE or UE capable of machine-to-machine communication (M2M), a sensor equipped with UE, tablet, mobile terminals, smart phone, laptop embedded equipped (LEE), laptop mounted equipment (LME), USB dangles, Customer Premises Equipment (CPE) etc.

Also in some embodiments generic terminology, "network node", is used. It can be any kind of network node which may comprise a base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH) etc.

Embodiments herein also include a computer program comprising instructions which, when executed by at least one processor of a transmitting 10 or receiving 20 radio node, cause the radio node to carry out any of the methods herein. In one or more embodiments, a carrier containing the computer program is one of communication media (or transitory media, such as an electronic signal, optical signal, radio signal) or computer readable storage media (or non-transitory media). The term computer storage media includes both volatile and nonvolatile, removable and non-removable media implemented in any method or technology for storage of information; computer storage media includes but is not limited to RAM, ROM, EEPROM, flash memory or other memory technology, CD-ROM, digital versatile disks or other optical disk storage, magnetic cassettes, magnetic tape, magnetic disk storage or other magnetic storage devices, or any other medium which stores the desired information and is accessible by a computer.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method for precoding a transmission from an antenna array, the antenna array including antenna elements arranged along at least first and second axes at a transmitting radio node, the method comprising:
configuring a main codebook with respect to the second axis, while leaving the main codebook unchanged with respect to the first axis, wherein the main codebook is representable as a Kronecker product of a first codebook and a second codebook, wherein the first codebook corresponds to the first axis and comprises predetermined sub-precoders, and wherein the second codebook corresponds to the second axis and comprises configurable sub-precoders, wherein the main codebook comprises precoders that are each representable as at least a Kronecker product of one of the sub-precoders of the first codebook and one of the sub-precoders of the second codebook;
precoding the transmission using the main codebook as configured with respect to the second axis; and
transmitting the precoded transmission using the antenna array.

2. The method of claim 1, further comprising:
initially obtaining a precoded signal, which has been precoded using a codebook representable as a Kronecker product of the first codebook and a third codebook, which comprises sub-precoders; and
transforming the precoded signal by a linear transformation representable as a Kronecker product including a factor representing a linear mapping from at least a subset of the sub-precoders of the third codebook to the sub-precoders of the second codebook.

3. The method of claim 2, wherein the linear mapping defines a one-to-one association between the sub-precoders of the second codebook and at least a subset of the sub-precoders of the third codebook, in such manner that a component of the precoded signal corresponding to one of the sub-precoders of the third codebook is mapped to a component corresponding to an associated sub-precoder of the second codebook.

4. The method of claim 2, wherein the linear mapping from at least a subset of the sub-precoders of the third codebook to the sub-precoders of the second codebook is equivalent to the joint action of:
   computing inner products with at least a subset of the sub-precoders of the third codebook; and
   linearly combining the sub-precoders of the second codebook using the computed inner products as weighting factors.

5. The method of claim 3, wherein the linear transformation includes a further factor representing an $M_h$-dimensional identity mapping, where $M_h$ is the number of antenna ports of the first codebook.

6. The method of claim 2, wherein the linear transformation defines a one-to-one association between the sub-precoders of the second codebook and at least a subset of the sub-precoders of the third codebook, in such manner that a component of the precoded signal corresponding to a prototype precoder, which is representable as a Kronecker product including one of the sub-precoders of the third codebook, is mapped to a component corresponding to a precoder of the main codebook, which precoder includes a sub-precoder of the second codebook that is associated with said one sub-precoder of the third codebook.

7. The method of claim 6, wherein:
   the antenna array is an $N_h \times N_v$ array or spans an $N_h \times N_v$ array; and
   the linear transformation is equivalent to the joint action of applying conjugates of prototype precoders and using the results to combine embedded sub-precoders;
   each of the $N_h N_v$ prototype precoders is representable as a Kronecker product of a vector from an $N_h$-dimensional basis and a sub-precoder of the third codebook, wherein the sub-precoder is selected from a subset of the third codebook; and
   each of the sub-precoders from the second codebook is embedded into $N_h N_v$-dimensional space by forming a Kronecker product with an N-dimensional identity mapping.

8. The method of claim 2, wherein the linear mapping is restricted to a subset of linearly independent sub-precoders of the third codebook.

9. The method of claim 8, wherein the subset of the third codebook is indicated by a precoding matrix indicator (PMI) received at the transmitting radio node from a receiving radio node.

10. The method of claim 1, wherein the transmission comprises user data or a reference signal.

11. The method of claim 10, wherein the transmission comprises a channel state information reference signal (CSI-RS).

12. The method of claim 10, further comprising:
   receiving feedback information from a receiving radio node in response to the transmission; and
   selecting, from the main codebook, a precoder to be used for subsequent transmissions.

13. The method of claim 12, wherein the feedback information makes reference to the third codebook.

14. The method of claim 1, further comprising adapting at least one sub-precoder in accordance with local radio conditions.

15. The method of claim 14, wherein at least one sub-precoder of the second codebook is adapted in accordance with data received at a deployment site of the transmitting radio node.

16. The method of claim 1, wherein:
   the transmitting radio node operates as one of a plurality of stationary nodes in a radio access network;
   the first codebook is common to said plurality of stationary nodes; and
   the second codebook is configured independently for the transmitting radio node.

17. A computer program product stored in a non-transitory computer readable medium for controlling precoding of a transmission from an antenna array, the antenna array including antenna elements arranged along at least first and second axes at a transmitting radio node, the computer program product comprising software instructions which, when run on a processing circuit of the transmitting radio node, causes the transmitting radio node to:
   configuring a main codebook with respect to the second axis, while leaving the main codebook unchanged with respect to the first axis, wherein the main codebook is representable as a Kronecker product of a first codebook and a second codebook, wherein the first codebook corresponds to the first axis and comprises predetermined sub-precoders, and wherein the second codebook corresponds to the second axis and comprises configurable sub-precoders, wherein the main codebook comprises precoders that are each representable as at least a Kronecker product of one of the sub-precoders of the first codebook and one of the sub-precoders of the second codebook;
   precode the transmission using the main codebook as configured with respect to the second axis; and
   transmit the precoded transmission using the antenna array.

18. A transmitting radio node for precoding a transmission from an antenna array, the antenna array including antenna elements arranged along at least first and second axes at the transmitting radio node, the transmitting radio node comprising:
   a processing circuit;
   memory containing instructions which, when executed by the processing circuit, causes the transmitting radio node to:
      configuring a main codebook with respect to the second axis, while leaving the main codebook unchanged with respect to the first axis, wherein the main codebook is representable as a Kronecker product of a first codebook and a second codebook, wherein the first codebook corresponds to the first axis and comprises predetermined sub-precoders, and wherein the second codebook corresponds to the second axis and comprises configurable sub-precoders, wherein the main codebook comprises precoders that are each representable as at least a Kronecker product of one of the sub-precoders of the first codebook and one of the sub-precoders of the second codebook;
      precode the transmission using the main codebook as configured with respect to the second axis; and
      transmit the precoded transmission using the antenna array.

19. The transmitting radio node of claim 18, wherein the memory contains instructions which, when executed by the processing circuit, cause the transmitting radio node to:
initially obtain a precoded signal, which has been precoded using a codebook representable as a Kronecker product of the first codebook and a third codebook, which comprises sub-precoders; and
transform the precoded signal by a linear transformation representable as a Kronecker product including a factor representing a linear mapping from at least a subset of the sub-precoders of the third codebook to the sub-precoders of the second codebook.

20. The transmitting radio node of claim 19, wherein the linear mapping defines a one-to-one association between the sub-precoders of the second codebook and at least a subset of the sub-precoders of the third codebook, in such manner that a component of the precoded signal corresponding to one of the sub-precoders of the third codebook is mapped to a component corresponding to an associated sub-precoder of the second codebook.

21. The transmitting radio node of claim 19, wherein the linear mapping from at least a subset of the sub-precoders of the third codebook to the sub-precoders of the second codebook is equivalent to the joint action of:
computing inner products with at least a subset of the sub-precoders of the third codebook; and
linearly combining the sub-precoders of the second codebook using the computed inner products as weighting factors.

22. The transmitting radio node of claim 19, wherein the linear transformation includes a further factor representing an $M_h$-dimensional identity mapping, where $M_h$ is the number of antenna ports of the first codebook.

23. The transmitting radio node of claim 19, wherein the linear transformation defines a one-to-one association between the sub-precoders of the second codebook and at least a subset of the sub-precoders of the third codebook, in such manner that a component of the precoded signal corresponding to a prototype precoder, which is representable as a Kronecker product including one of the sub-precoders of the third codebook, is mapped to a component corresponding to a precoder of the main codebook, which precoder includes a sub-precoder of the second codebook that is associated with said one sub-precoder of the third codebook.

24. The transmitting radio node of claim 23, wherein:
the antenna array is an $N_h \times N_v$ array or spans an $N_h \times N_v$ array; and
the linear transformation is equivalent to the joint action of applying conjugates of prototype precoders and using the results to combine embedded sub-precoders;
each of the $N_h N_v$ prototype precoders is representable as a Kronecker product of a vector from an $N_h$-dimensional basis and a sub-precoder of the third codebook, wherein the sub-precoder is selected from a subset of the third codebook; and
each of the sub-precoders from the second codebook is embedded into $N_h N_v$-dimensional space by forming a Kronecker product with an N-dimensional identity mapping.

25. The transmitting radio node of claim 19, wherein the linear mapping is restricted to a subset of linearly independent sub-precoders of the third codebook.

26. The transmitting radio node of claim 25, wherein the subset of the third codebook is indicated by a precoding matrix indicator (PMI) received at the transmitting radio node from a receiving radio node.

27. The transmitting radio node of claim 18, wherein the transmission comprises a channel state information reference signal (CSI-RS).

28. The transmitting radio node of claim 18, wherein:
the transmitting radio node operates as one of a plurality of stationary nodes in a radio access network;
the first codebook is common to said plurality of stationary nodes; and
the second codebook is configured independently for the transmitting radio node.

29. The transmitting radio node of claim 18, further comprising a configuration interface for configuring sub-precoders of the second codebook.

30. The method of claim 1, further comprising configuring one or more sub-precoders of the second codebook based on radio conditions at the transmitting radio node, wherein the predetermined sub-precoders of the first codebook are not configurable based on radio conditions at the transmitting radio node.

31. The method of claim 30, wherein configuring one or more sub-precoders of the second codebook based on radio conditions at the transmitting radio node comprises obtaining data indicative of a distribution of receiving radio node density in one or more spatial dimensions and configuring one or more sub-precoders of the second codebook based on the obtained data.

* * * * *